(12) United States Patent
Arai

(10) Patent No.: US 11,577,728 B2
(45) Date of Patent: Feb. 14, 2023

(54) VEHICLE CONTROL DEVICE

(71) Applicant: SUBARU CORPORATION, Tokyo (JP)

(72) Inventor: Shoto Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 153 days.

(21) Appl. No.: 17/078,915

(22) Filed: Oct. 23, 2020

(65) Prior Publication Data

US 2021/0179110 A1 Jun. 17, 2021

(30) Foreign Application Priority Data

Dec. 12, 2019 (JP) .............................. JP2019-224149

(51) Int. Cl.
*B60W 30/18* (2012.01)
*B60W 30/14* (2006.01)

(52) U.S. Cl.
CPC .... *B60W 30/18109* (2013.01); *B60W 30/143* (2013.01); *B60W 2510/18* (2013.01); *B60W 2520/105* (2013.01); *B60W 2552/15* (2020.02)

(58) Field of Classification Search
CPC ......... B60W 10/184; B60W 30/18027; B60W 30/18109
USPC ........................................................ 701/98
See application file for complete search history.

(56) References Cited

U.S. PATENT DOCUMENTS

| | | | | |
|---|---|---|---|---|
| 6,126,251 A * | 10/2000 | Yoshii | ................. | B60W 10/184 303/152 |
| 8,016,367 B2 * | 9/2011 | Hirata | ................... | B60W 10/08 303/151 |
| 9,296,376 B2 * | 3/2016 | Nishio | ............ | B60W 30/18127 |
| 10,471,960 B2 * | 11/2019 | Heo | ........................ | B60W 30/16 |
| 10,940,862 B1 * | 3/2021 | Dempsey | .......... | B60W 30/1884 |
| 2019/0193570 A1 * | 6/2019 | Okumura | ................ | F16D 61/00 |
| 2020/0047772 A1 * | 2/2020 | Yasue | .................... | B60W 30/12 |

FOREIGN PATENT DOCUMENTS

JP 2008-221935 A 9/2008

\* cited by examiner

*Primary Examiner* — Khoi H Tran
*Assistant Examiner* — Rodney P King
(74) *Attorney, Agent, or Firm* — McGinn I.P. Law Group, PLLC.

(57) ABSTRACT

A vehicle control device includes a controller configured to control operation of a braking device and operation of a driving motor. The controller can switch between a normal mode of controlling acceleration/deceleration in accordance with a driver's acceleration/deceleration operation, and a cruise control mode of maintaining the vehicle speed at a target speed without being dependent on the acceleration/deceleration operation. The controller is configured to execute braking control, including braking by the braking device and regenerative braking by the driving motor, during the cruise control mode in accordance with a change in a vehicle traveling condition. The braking control includes causing the braking device to generate a braking force without using the regenerative braking and subsequently executing a braking-force switching process including increasing a braking force by the regenerative braking while reducing the braking force from the braking device, if a determination result indicates that the vehicle speed is stable.

19 Claims, 5 Drawing Sheets

VEHICLE CONTROL DEVICE

CROSS-REFERENCE TO RELATED APPLICATIONS

The present application claims priority from Japanese Patent Application No. 2019-224149 filed on Dec. 12, 2019, the entire contents of which are hereby incorporated by reference.

BACKGROUND

The disclosure relates to vehicle control devices.

Japanese Unexamined Patent Application Publication No. 2008-221935 describes an example of a vehicle capable of executing, in addition to a normal mode, a cruise control mode for the purpose of assisting a driver in driving operation. In the normal mode, the acceleration and deceleration of the vehicle are controlled in accordance with an acceleration-and-deceleration operation (i.e., controlling of the accelerator pedal and the brake pedal) by the driver. In the cruise control mode, the vehicle speed is maintained at a target vehicle speed without being dependent on the acceleration-and-deceleration operation by the driver.

SUMMARY

An aspect of the disclosure provides a vehicle control device including a controller. The controller is configured to control operation of a braking device that is to apply a braking force to a vehicle, and configured to control operation of a driving motor that is to output a driving force to the vehicle. The controller is capable of executing a normal mode and a cruise control mode that are switchable. The normal mode is a mode in which acceleration and deceleration of the vehicle are controlled in accordance with an acceleration-and-deceleration operation by a driver. The cruise control mode is a mode in which a vehicle speed of the vehicle is maintained at a target vehicle speed by controlling torque of the driving motor without being dependent on the acceleration-and-deceleration operation by the driver. The controller is configured to execute braking control during the cruise control mode in accordance with a change in a traveling condition of the vehicle. The braking control includes braking by the braking device and regenerative braking by the driving motor. The braking control includes causing the braking device to generate the braking force without using the regenerative braking of the driving motor and subsequently executing a braking-force switching process if a determination result indicates that the vehicle speed of the vehicle has become stable. The braking-force switching process includes increasing a braking force according to the regenerative braking of the driving motor while reducing the braking force from the braking device.

An aspect of the disclosure provides a vehicle control device including circuitry. The circuitry is configured to control operation of a braking device that is to apply a braking force to a vehicle, and configured to control operation of a driving motor that is to output a driving force to the vehicle. The circuitry is capable of executing a normal mode and a cruise control mode that are switchable. The normal mode is a mode in which acceleration and deceleration of the vehicle are controlled in accordance with an acceleration-and-deceleration operation by a driver. The cruise control mode is a mode in which a vehicle speed of the vehicle is maintained at a target vehicle speed by controlling torque of the driving motor without being dependent on the acceleration-and-deceleration operation by the driver. The circuitry is configured to execute braking control during the cruise control mode in accordance with a change in a traveling condition of the vehicle. The braking control includes braking by the braking device and regenerative braking by the driving motor. The braking control includes causing the braking device to generate the braking force without using the regenerative braking of the driving motor and subsequently executing a braking-force switching process if a determination result indicates that the vehicle speed of the vehicle has become stable. The braking-force switching process includes increasing a braking force according to the regenerative braking of the driving motor while reducing the braking force from the braking device.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Figure 1:
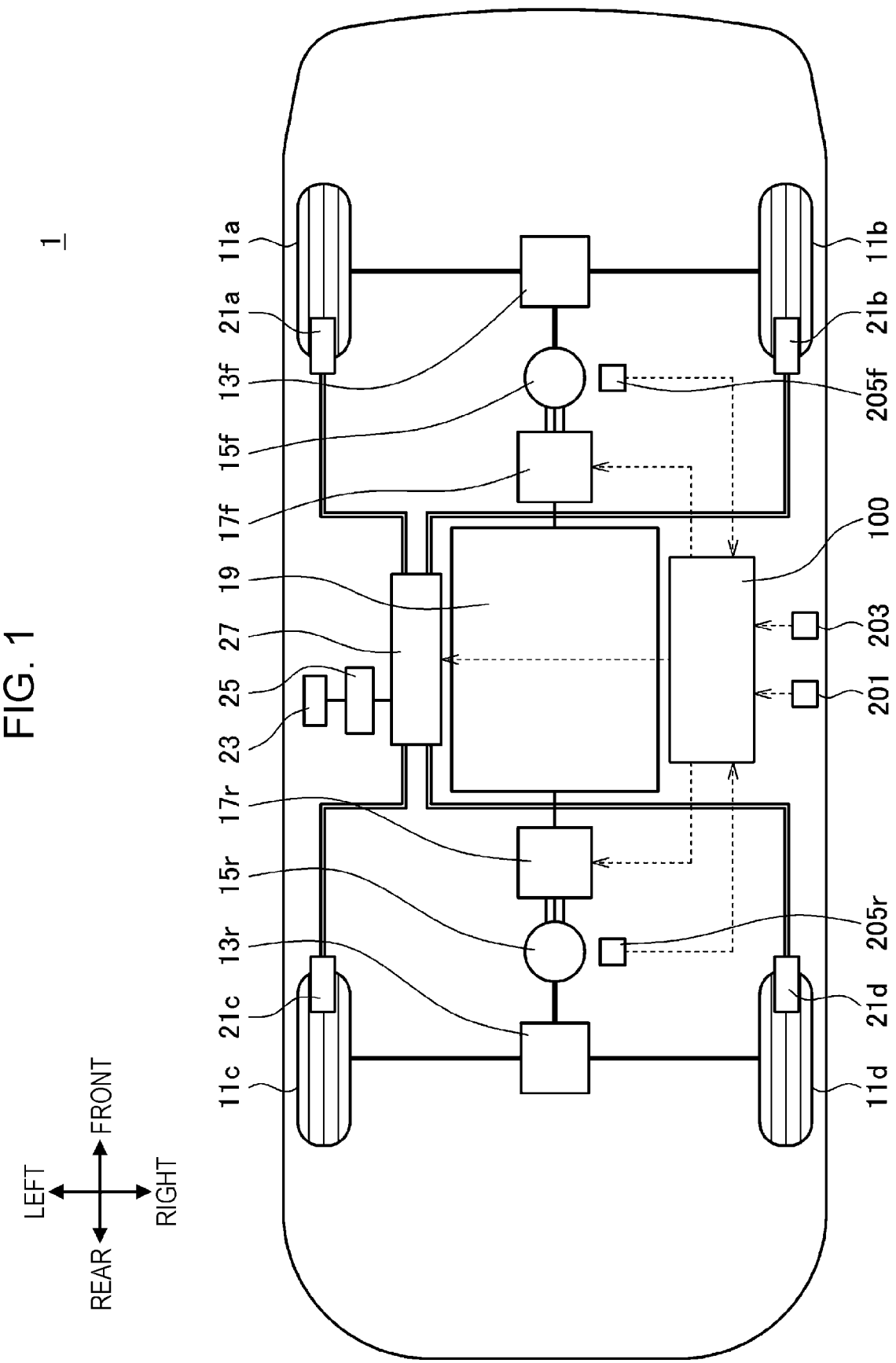
FIG. 1 schematically illustrates the configuration of a vehicle equipped with a control device according to an embodiment of the disclosure.

In a vehicle equipped with a driving motor as a driving source, torque of the driving motor is controlled in the cruise control mode so that the vehicle speed is maintained at the target vehicle speed. Thus, the vehicle can be braked by using regenerative braking of the driving motor. During the cruise control mode, for example, the vehicle is likely to accelerate in accordance with a change in the traveling condition of the vehicle, such as when the vehicle enters a downhill road from a flat road. In such a case, after the vehicle is braked by temporarily using a braking device, such as a hydraulic braking device, it is conceivable that a braking-force switching process is subsequently performed. Such a braking-force switching process involves increasing the braking force according to regenerative braking while reducing the braking force applied by the braking device.

In the cruise control mode, a target braking force (i.e., a target value for the braking force to be applied to the vehicle) is calculated such that the vehicle speed approaches the target vehicle speed. In the braking-force switching process, a shock may occur in the vehicle due to a change in the target braking force. In particular, in a cruise control mode in which a relatively low target vehicle speed is used, since a scene where the vehicle travels on a rough road surface or on a road surface with large variations in the gradient is expected, the vehicle speed is liable to change. Thus, the target braking force is likely to change due to the change in the vehicle speed and therefore a shock is likely to occur in the vehicle particularly in the braking-force switching process.

It is desirable to provide a vehicle control device that can perform a braking-force switching process while suppressing a shock occurring in the vehicle during a cruise control mode.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

The configuration of a vehicle 1 equipped with a control device 100 according to the embodiment of the disclosure will now be described with reference to FIG. 1 and FIG. 2.

FIG. 1 schematically illustrates the configuration of the vehicle 1. The vehicle 1 is illustrated in FIG. 1 such that the advancing direction of the vehicle 1 is defined as a forward direction, the reverse direction opposite to the advancing direction is defined as a rearward direction, and the left side and the right side of the vehicle 1 when oriented in the forward direction are defined as a leftward direction and a rightward direction, respectively.

The vehicle 1 is an electric vehicle that is equipped with driving motors (i.e., a front-wheel driving motor 15f and a rear-wheel driving motor 15r in FIG. 1) as driving sources and that travels by using power output from the driving motors.

The vehicle 1 to be described below is an example of a vehicle equipped with a control device according to an embodiment of the disclosure. As will be mentioned later, the configuration of a vehicle equipped with the control device according to the embodiment of the disclosure is not particularly limited to the configuration of the vehicle 1.

As illustrated in FIG. 1, the vehicle 1 includes front wheels 11a and 11b, rear wheels 11c and 11d, a front differential device 13f, a rear differential device 13r, the front-wheel driving motor 15f, the rear-wheel driving motor 15r, an inverter 17f, an inverter 17r, a battery 19, braking devices 21a, 21b, 21c, and 21d, a brake pedal 23, a master cylinder 25, a hydraulic control unit 27, the control device 100, an accelerator opening-degree sensor 201, a brake sensor 203, a front-wheel-motor rotation-speed sensor 205f, and a rear-wheel-motor rotation-speed sensor 205r.

The front wheel 11a, the front wheel 11b, the rear wheel 11c, and the rear wheel 11d may simply be referred to as wheels 11 if they are not to be distinguished from one another. Furthermore, the front-wheel driving motor 15f and the rear-wheel driving motor 15r may simply be referred to as driving motors 15 if they are not to be distinguished from each other. Moreover, the inverter 17f and the inverter 17r may simply be referred to as inverters 17 if they are not to be distinguished from each other. The braking device 21a, the braking device 21b, the braking device 21c, and the braking device 21d may simply be referred to as braking devices 21 if they are not to be distinguished from one another. Furthermore, the front-wheel-motor rotation-speed sensor 205f and the rear-wheel-motor rotation-speed sensor 205r may simply be referred to as motor rotation-speed sensors 205 if they are not to be distinguished from each other.

The front-wheel driving motor 15f is a driving motor that outputs power for driving the front wheels 11a and 11b. The front wheel 11a corresponds to a left front wheel, and the front wheel 11b corresponds to a right front wheel.

In detail, the front-wheel driving motor 15f is driven by using electric power supplied from the battery 19. The front-wheel driving motor 15f is coupled to the front differential device 13f. The front differential device 13f is coupled to the front wheels 11a and 11b by using a driving shaft. The power output from the front-wheel driving motor 15f is transmitted to the front differential device 13f, and is subsequently transmitted distributively to the front wheels 11a and 11b by the front differential device 13f.

The front-wheel driving motor 15f is, for example, a polyphase alternating-current motor and is coupled to the battery 19 with the inverter 17f interposed therebetween. Direct-current electric power supplied from the battery 19 is converted into alternating-current electric power by the inverter 17f before being supplied to the front-wheel driving motor 15f.

In addition to outputting power for driving the front wheels 11a and 11b, the front-wheel driving motor 15f serves as an electric generator that generates electricity by using kinetic energy of the front wheels 11a and 11b. In a case where the front-wheel driving motor 15f serves as an electric generator, electricity is generated by the front-wheel driving motor 15f, and a braking force is applied to the vehicle 1 in accordance with regenerative braking. Alternating-current electric power generated by the front-wheel driving motor 15f is converted into direct-current electric power by the inverter 17f before being supplied to the battery 19, whereby the battery 19 is recharged.

The rear-wheel driving motor 15r is a driving motor that outputs power for driving the rear wheels 11c and 11d. The rear wheel 11c corresponds to a left rear wheel, and the rear wheel 11d corresponds to a right rear wheel.

In detail, the rear-wheel driving motor 15r is driven by using electric power supplied from the battery 19. The rear-wheel driving motor 15r is coupled to the rear differential device 13r. The rear differential device 13r is coupled to the rear wheels 11c and 11d by using a driving shaft. The power output from the rear-wheel driving motor 15r is transmitted to the rear differential device 13r, and is subsequently transmitted distributively to the rear wheels 11c and 11d by the rear differential device 13r.

The rear-wheel driving motor 15r is, for example, a polyphase alternating-current motor and is coupled to the battery 19 with the inverter 17r interposed therebetween. Direct-current electric power supplied from the battery 19 is converted into alternating-current electric power by the inverter 17r before being supplied to the rear-wheel driving motor 15r.

In addition to outputting power for driving the rear wheels 11c and 11d, the rear-wheel driving motor 15r serves as an electric generator that generates electricity by using kinetic energy of the rear wheels 11c and 11d. In a case where the rear-wheel driving motor 15r serves as an electric generator, electricity is generated by the rear-wheel driving motor 15r, and a braking force is applied to the vehicle 1 in accordance with regenerative braking. Alternating-current electric power generated by the rear-wheel driving motor 15r is converted into direct-current electric power by the inverter 17r before being supplied to the battery 19, whereby the battery 19 is recharged.

The braking devices 21 apply a braking force to the wheels 11 by using oil pressure. The sum of the braking forces applied to the wheels 11 by the individual braking devices 21 is the braking force applied to the vehicle 1.

The brake pedal 23 accepts a braking operation performed by the driver. A braking force according to a brake operation amount indicating an amount by which the brake pedal 23 is operated is applied to the wheels 11 by the braking devices 21. The brake pedal 23 is coupled to the master cylinder 25 with a servo unit interposed therebetween.

The master cylinder 25 generates oil pressure in accordance with the brake operation amount. The master cylinder 25 is coupled to each braking device 21 with the hydraulic control unit 27 interposed therebetween. The oil pressure generated by the master cylinder 25 is supplied to each braking device 21 via the hydraulic control unit 27.

For example, each braking device 21 has a brake caliper including brake pads and a wheel cylinder. The brake pads provided are, for example, a pair of brake pads facing each other at opposite side surfaces of a brake disk that rotates together with the corresponding wheel 11. The wheel cylinder is disposed within the brake caliper, and the wheel cylinder is provided with a piston which is slidable therein. The ends of the piston are provided facing the brake pads, and the brake pads move toward the respective side surfaces of the brake disk with the sliding of the piston. The oil pressure generated by the master cylinder 25 is supplied to the wheel cylinder of each braking device 21. Consequently, with the movement of the piston and the brake pads in the brake caliper, the opposite side surfaces of the brake disk are sandwiched by the pair of brake pads, whereby a braking force is applied to the corresponding wheel 11.

The hydraulic control unit 27 is capable of adjusting the oil pressure to be supplied to the braking devices 21 (i.e., hydraulic braking pressure for the braking devices 21). In detail, the hydraulic control unit 27 has devices, such as a pump and a control valve, and controls the operation of these devices to control the hydraulic braking pressure for the braking devices 21. Consequently, the braking force to be applied to each wheel 11 is controlled. The hydraulic control unit 27 may be capable of individually adjusting the oil pressure to be supplied to each braking device 21. Moreover, the brake system may be two brake systems.

The accelerator opening-degree sensor 201 detects an accelerator opening degree indicating an amount by which the accelerator pedal is operated by the driver, and outputs the detection result.

The brake sensor 203 detects the brake operation amount indicating the amount by which the brake pedal 23 is operated by the driver, and outputs the detection result.

The front-wheel-motor rotation-speed sensor 205f detects the rotation speed of the front-wheel driving motor 15f and outputs the detection result. The rear-wheel-motor rotation-speed sensor 205r detects the rotation speed of the rear-wheel driving motor 15r and outputs the detection result. The detection results of the motor rotation-speed sensors 205 are used as information indicating the rotation speed of a power transmission shaft (i.e., a shaft included in a power transmission system between the driving motors 15 and the wheels 11) of the vehicle 1 in a process performed by the control device 100.

The control device 100 includes, for example, a central processing unit (CPU) serving as an arithmetic processing unit, a read-only memory (ROM) serving as a storage element that stores programs and arithmetic parameters to be used by the CPU, and a random access memory (RAM) serving as a storage element that temporarily stores parameters that appropriately change in a process executed by the CPU.

The control device 100 communicates with each of the devices (e.g., the inverters 17, the hydraulic control unit 27, the accelerator opening-degree sensor 201, the brake sensor 203, and the motor rotation-speed sensors 205) provided in the vehicle 1. The communication between the control device 100 and each device is realized by using, for example, controller area network (CAN) communication.

Figure 2:
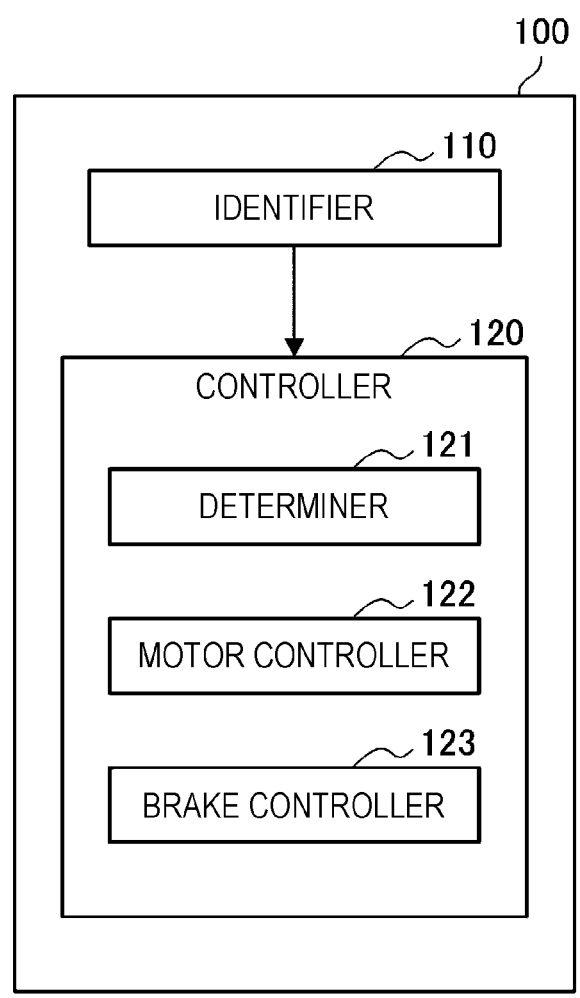
FIG. 2 is a block diagram illustrating an example of a functional configuration of the control device according to the embodiment of the disclosure.

FIG. 2 is a block diagram illustrating an example of a functional configuration of the control device 100.

For example, as illustrated in FIG. 2, the control device 100 has an identifier 110 and a controller 120.

The identifier 110 identifies the vehicle speed of the vehicle 1 (simply referred to as "vehicle speed" hereinafter) based on the rotation speed of the power transmission shaft of the vehicle 1. Information indicating the vehicle speed identified by the identifier 110 is output to the controller 120 and is used in a process performed by the controller 120.

In detail, the identifier 110 identifies the vehicle speed based on the detection results of the motor rotation-speed sensors 205. The vehicle speed may be identified by using the detection results of both the front-wheel-motor rotation-speed sensor 205f and the rear-wheel-motor rotation-speed sensor 205r or by using the detection result of one of the front-wheel-motor rotation-speed sensor 205f and the rear-wheel-motor rotation-speed sensor 205r.

Furthermore, the vehicle speed may be identified by using information (e.g., information indicating the rotation speeds of the driving shafts that couple the wheels 11 and the differential devices to each other) other than the detection results of the motor rotation-speed sensors 205 as information indicating the rotation speed of the power transmission shaft of the vehicle 1.

The controller 120 controls the operation of each device in the vehicle 1 to control the traveling of the vehicle 1. For example, the controller 120 includes a determiner 121, a motor controller 122, and a brake controller 123.

The determiner 121 performs various types of determination processes by utilizing information transmitted to the control device 100 from various devices in the vehicle 1. A determination result obtained by the determiner 121 is used in various types of processes performed by the controller 120.

The motor controller 122 controls the operation of each inverter 17 and thus controls the operation of each driving motor 15. In detail, the motor controller 122 controls the operation of a switching element of the inverter 17f and thus controls the supply of electric power between the battery 19 and the front-wheel driving motor 15f. Consequently, the motor controller 122 can control the production of power and the generation of electricity by the front-wheel driving motor 15f. Moreover, the motor controller 122 controls the operation of a switching element of the inverter 17r and thus controls the supply of electric power between the battery 19 and the rear-wheel driving motor 15r. Consequently, the motor controller 122 can control the production of power and the generation of electricity by the rear-wheel driving motor 15r.

In a case where the motor controller 122 is to drive the driving motors 15 to apply a driving force to the vehicle 1, the motor controller 122 may drive both the front-wheel driving motor 15f and the rear-wheel driving motor 15r or may drive one of the front-wheel driving motor 15f and the rear-wheel driving motor 15r.

In the case where both the front-wheel driving motor 15f and the rear-wheel driving motor 15r are to be driven, the distribution of the driving force of each driving motor 15 can be appropriately set. In the following description, the torque of the driving motors 15 refers to a total value of the torque of the front-wheel driving motor 15f and the torque of the rear-wheel driving motor 15r.

The brake controller 123 controls the operation of the braking devices 21. In detail, the brake controller 123 controls the operation of the hydraulic control unit 27 and thus controls the hydraulic braking pressure for the braking devices 21 provided for the respective wheels 11.

Consequently, the brake controller 123 can control the braking force to be applied to the vehicle 1.

The controller 120 is capable of switching the driving mode of the vehicle 1 between a normal mode and a cruise control mode. A normal mode is a driving mode in which the acceleration and deceleration of the vehicle 1 are controlled in accordance with an acceleration-and-deceleration operation (i.e., controlling of the accelerator pedal and the brake pedal 23) by the driver. A cruise control mode is a driving mode in which the vehicle speed is maintained at a target vehicle speed by controlling the torque of the driving motors 15 without being dependent on the acceleration-and-deceleration operation by the driver.

Furthermore, the controller 120 is capable of switching the cruise control mode between a high-speed cruise control mode and a low-speed cruise control mode. In the low-speed cruise control mode, a target vehicle speed used is lower than a target vehicle speed in the high-speed cruise control mode. For example, a target vehicle speed in the high-speed cruise control mode is set to a speed ranging between 20 km/h and 115 km/h inclusive, whereas a target vehicle speed in the low-speed cruise control mode is set to a speed ranging between 2 km/h and 15 km/h inclusive. A target vehicle speed in the cruise control mode is adjustable in accordance with, for example, an input operation performed by the driver.

For example, the vehicle 1 is provided with an input device (e.g., either one of a switch and a button) used for selecting the driving mode from among the normal mode, the high-speed cruise control mode, and the low-speed cruise control mode. The driver can select the driving mode by operating the input device. The controller 120 executes the driving mode selected by the driver. If a specific operation, such as a braking operation, is performed by the driver during the cruise control mode, the controller 120 stops the cruise control mode and switches to the normal mode.

In the normal mode, the controller 120 controls the operation of the driving motors 15 such that the driving force applied to the vehicle 1 accords with the opening degree of the accelerator pedal. Consequently, the acceleration of the vehicle 1 can be controlled in accordance with the controlling of the accelerator pedal by the driver. Furthermore, the controller 120 controls the operation of the braking devices 21 such that the braking force applied to the vehicle 1 accords with the brake operation amount. Consequently, the deceleration of the vehicle 1 can be controlled in accordance with the controlling of the brake pedal 23 by the driver.

In the cruise control mode, the controller 120 calculates a torque command value for the driving motors 15 and controls the torque of the driving motors 15 to the torque command value such that the vehicle speed approaches the target vehicle speed. For example, the controller 120 uses feedforward control based on the vehicle speed and feedback control (e.g., proportional-integral-derivative (PID) control) based on a deviation between the vehicle speed and the target vehicle speed to control the torque of the driving motors 15, and calculates a torque command value as a command for the torque to the driving motors 15. In this case, for example, a torque command value Tc to be calculated is expressed using Expression (1) indicated below.

$$Tc=Tf+Tp+Ti+Td \tag{1}$$

In Expression (1), Tf denotes the torque of a feedforward-control component based on the vehicle speed, Tp denotes the torque of a proportional-control component (i.e., P component) based on a deviation between the vehicle speed and the target vehicle speed, Ti denotes the torque of an integral-control component (i.e., I component) based on the deviation, and Td denotes the torque of a derivative-control component (i.e., D component) based on the deviation. The torque Tp of the P component is obtained by multiplying the deviation by a gain. The torque Ti of the I component is obtained by multiplying an integral value of the deviation by a gain. The torque Td of the D component is obtained by multiplying a derivative value of the deviation by a gain. The torque Tf of the feedforward-control component corresponds to an estimated torque to be used for maintaining the vehicle speed at the target vehicle speed when the vehicle 1 is traveling on a flat road. A flat road refers to a road in which an absolute value of a gradient (i.e., an inclination in the advancing direction of the vehicle 1 relative to the horizontal direction) is smaller than or equal to a predetermined value. A downhill road to be mentioned later refers to a road other than a flat road and having a negative gradient, and an uphill road to be mentioned later refers to a road other than a flat road and having a positive gradient.

The calculation method for the torque command value Tc for the driving motors 15 is not limited to the example where the torque command value Tc is calculated using Expression (1). For example, the feedforward control may be omitted from the above example (i.e., the torque Tf may be omitted from Expression (1)), or the PID control may be replaced with proportional-integral (PI) control (i.e., the torque Td may be omitted from Expression (1)).

If the vehicle 1 is to be braked during the cruise control mode, the controller 120 calculates a target braking force (i.e., target value for the braking force to be applied to the vehicle 1) such that the vehicle speed approaches the target vehicle speed. In the cruise control mode, the controller 120 basically controls a braking force according to regenerative braking of the driving motors 15 to be the target braking force. However, as will be mentioned later, there may be a case where braking control including braking by the braking devices 21 and regenerative braking by the driving motors 15 is performed during the cruise control mode. In this braking control performed during the cruise control mode, the controller 120 controls a total value of the braking force from the braking devices 21 and the braking force according to the regenerative braking by the driving motors 15 to be the target braking force.

The function that the control device 100 according to the embodiment has may partially be distributed to a plurality of control devices, or a plurality of functions may be realized by a single control device. In a case where the function that the control device 100 has is partially distributed to a plurality of control devices, the plurality of control devices may be coupled to each other by using a communication bus, such as a controller area network (CAN).

As mentioned above, the controller 120 of the control device 100 can execute the cruise control mode in which the vehicle speed of the vehicle 1 is maintained at the target vehicle speed by controlling the torque of the driving motors 15 without being dependent on the acceleration-and-deceleration operation by the driver. During the cruise control mode, the controller 120 executes the braking control including braking by the braking devices 21 and regenerative braking by the driving motors 15 in accordance with a change in the traveling condition of the vehicle. In the braking control, the controller 120 causes the braking devices 21 to generate a braking force without using the regenerative braking of the driving motors 15, and subsequently executes the braking-force switching process if it is determined that the vehicle speed of the vehicle 1 has become stable. The braking-force switching process involves increasing the braking force according to the regenerative braking of the driving motors 15 while reducing the braking force from the braking devices 21.

By performing the above-described braking control, a situation where the braking-force switching process is performed under a condition where the target braking force is significantly changing due to a change in the vehicle speed can be suppressed. Consequently, during the cruise control mode, the braking-force switching process can be performed while a shock occurring in the vehicle 1 can be suppressed. A detailed description of a braking-control-related process performed by the controller 120 during the cruise control mode will be provided later.

Operation of Control Device

Next, the operation of the control device 100 according to the embodiment of the disclosure will be described with reference to FIG. 3, FIG. 4, and FIG. 5.

As mentioned above, the braking control performed during the cruise control mode involves causing the braking devices 21 to generate a braking force without using the regenerative braking of the driving motors 15, and subsequently executing the braking-force switching process if it is determined that the vehicle speed of the vehicle 1 has become stable, thereby performing the braking-force switching process while suppressing a shock occurring in the vehicle 1.

The controller 120 executes the braking control if the vehicle 1 is likely to accelerate in accordance a change in the traveling condition of the vehicle 1. In such a case, if the vehicle 1 is braked in accordance with the regenerative braking of the driving motors 15 alone, the braking force is insufficient, possibly causing the vehicle 1 to accelerate excessively. Thus, the vehicle 1 is braked by temporarily using the braking devices 21, thereby appropriately braking the vehicle 1.

An example of a case where the vehicle 1 is likely to accelerate is a case where the vehicle 1 traveling on a first road enters a second road having a downward gradient relative to the advancing direction on the first road. For example, if the vehicle 1 enters a downhill road as the second road from either one of a flat road and an uphill road as the first road, or if the vehicle 1 enters a flat road as the second road from an uphill road as the first road, the vehicle 1 is likely to accelerate. An example of a case, other than the aforementioned case, where the vehicle 1 is likely to accelerate is a case where the vehicle 1 starts moving from a halted state on a downhill road.

The following description relates to an example where whether the braking control is to be executed is determined based on the acceleration of the vehicle 1 so as to appropriately execute the braking control if the vehicle 1 is likely to accelerate in accordance with a change in the traveling condition of the vehicle 1. However, the method of determining whether the braking control is to be executed is not particularly limited, as will be described later.

Because a large driving force can be generated in the vehicle 1 as the target vehicle speed in the cruise control mode decreases, the vehicle 1 can travel easier on a rough road surface or on a road surface with large variations in the gradient. Thus, in the low-speed cruise control mode, a scene where the vehicle 1 travels on a rough road surface or on a road surface with large variations in the gradient is expected, as compared with the high-speed cruise control mode and therefore the vehicle speed is liable to change.

This implies that the target braking force is likely to change due to the change in the vehicle speed and thus the possibility of the occurrence of a shock increases in the vehicle 1 in the braking-force switching process.

Accordingly, the controller 120 desirably executes the braking control during the low-speed cruise control mode by causing the braking devices 21 to generate a braking force without using the regenerative braking of the driving motors 15, and subsequently executing the braking-force switching process if it is determined that the vehicle speed has become stable.

The following description relates to an example where the braking-force switching process is executed when it is determined that the vehicle speed has become stable in the braking control executed during the low-speed cruise control mode. Alternatively, the controller 120 may execute the braking control during the high-speed cruise control mode by causing the braking devices 21 to generate a braking force without using the regenerative braking of the driving motors 15, and subsequently executing the braking-force switching process if it is determined that the vehicle speed has become stable. As another alternative, the controller 120 may execute the braking-force switching process during the high-speed cruise control mode regardless of a determination result indicating whether the vehicle speed has become stable.

Figure 3:
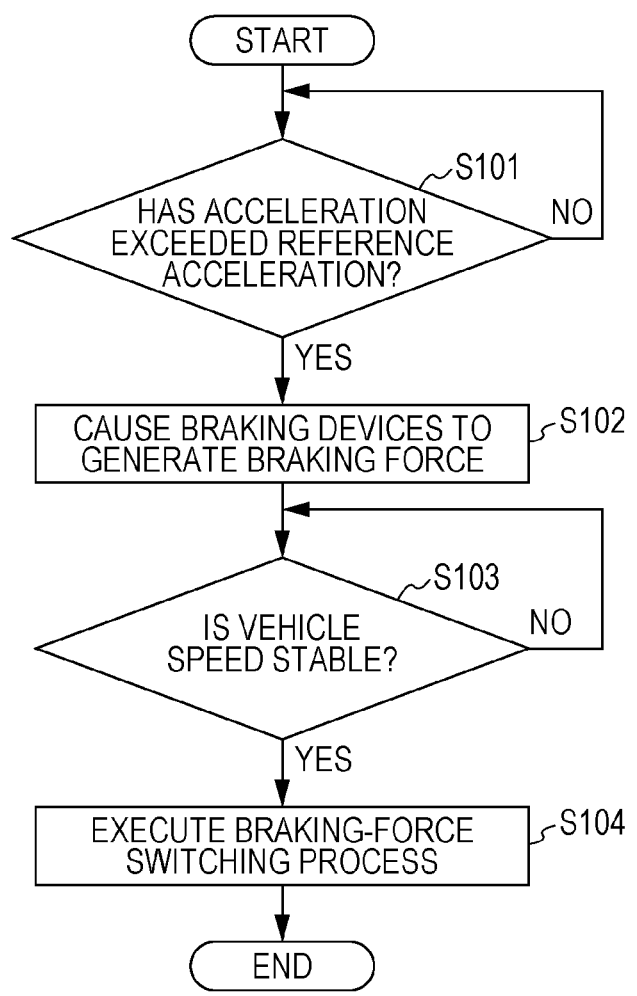
FIG. 3 is a flowchart illustrating an example of the flow of a braking-control-related process performed by a controller according to the embodiment of the disclosure during a low-speed cruise control mode.

FIG. 3 is a flowchart illustrating an example of the flow of a braking-control-related process performed by the controller 120 during the low-speed cruise control mode. In detail, the control flow illustrated in FIG. 3 is repeatedly executed during the low-speed cruise control mode.

When the control flow illustrated in FIG. 3 commences, the determiner 121 first determines in step S101 whether the acceleration of the vehicle 1 has exceeded reference acceleration. If it is determined that the acceleration of the vehicle 1 has exceeded the reference acceleration (YES in step S101), the control flow proceeds to step S102. In contrast, if it is determined that the acceleration of the vehicle 1 has not exceeded the reference acceleration (NO in step S101), the determination process in step S101 is repeated.

In step S101, the determiner 121 determines that the vehicle 1 is likely to accelerate in accordance with a change in the traveling condition of the vehicle 1 based on a fact that the acceleration of the vehicle 1 has exceeded the reference acceleration.

Thus, the reference acceleration is appropriately set to a value based on which it is appropriately determinable whether the vehicle 1 is likely to accelerate in accordance with a change in the traveling condition of the vehicle 1.

For example, if the acceleration of the vehicle 1 exceeds the reference acceleration when the vehicle 1 is traveling (i.e., after a predetermined time period has elapsed from when the vehicle 1 starts moving), the determiner 121 can determine that the vehicle 1 is likely to accelerate as the vehicle 1 traveling on a first road enters a second road having a downward gradient relative to the advancing direction on the first road (e.g., travels from a flat road to a downhill road). Furthermore, if the acceleration of the vehicle 1 exceeds the reference acceleration after the vehicle 1 starts moving (i.e., before a predetermined time period elapses from when the vehicle 1 starts moving), the determiner 121 can determine that the vehicle 1 is likely to accelerate as the vehicle 1 starts moving from a halted state on a downhill road.

If the determination result obtained in step S101 indicates YES, the controller 120 executes the braking control to cause the braking devices 21 to generate a braking force in step S102. In this case, the controller 120 prohibits regenerative braking of the driving motors 15 and brakes the vehicle 1 by using the braking force from the braking devices 21.

For example, in a case where the vehicle 1 traveling on a first road enters a second road having a downward gradient relative to the advancing direction on the first road (e.g., travels from a flat road to a downhill road), the controller 120 causes the driving motors 15 to stop applying a driving force to the vehicle 1 and causes the braking devices 21 to generate a braking force. Furthermore, for example, in a case where the vehicle 1 starts moving from a halted state on a downhill road, the controller 120 causes the braking devices 21 to generate a braking force while maintaining the state where the driving by the driving motors 15 is stopped.

Then, in step S103, the determiner 121 determines whether the vehicle speed of the vehicle 1 has become stable. If the determination result indicates that the vehicle speed has become stable (YES in step S103), the control flow proceeds to step S104. In contrast, if the determination result indicates that the vehicle speed has not become stable (NO in step S103), the determination process in step S103 is repeated.

In step S103, the determiner 121 determines that the vehicle speed has become stable if, for example, a difference between a maximum value and a minimum value of the vehicle speed within a reference time period is smaller than or equal to a threshold value. The aforementioned reference time period may be set to a time period long enough to an extent that it is appropriately determinable whether the vehicle speed has become stable. Furthermore, the aforementioned threshold value may be set to a value small enough to an extent that it is appropriately determinable whether the vehicle speed has become stable. The determination process in step S103 is not limited to the above-described example where the determination process is performed based on the transition of the vehicle speed. For example, the determination process may be performed based on the transition of the acceleration of the vehicle 1.

If the determination result obtained in step S103 indicates YES, the controller 120 executes the braking-force switching process, and the control flow illustrated in FIG. 3 ends. In the braking-force switching process, the controller 120 increases the braking force according to the regenerative braking of the driving motors 15 while reducing the braking force from the braking devices 21.

In the braking-force switching process, it is desirable that the rate of decrease of the braking force applied by the braking devices 21 (i.e., an amount of decrease per unit time) and the rate of increase of the braking force according to the regenerative braking of the driving motors 15 (i.e., an amount of increase per unit time) be as high as possible. Consequently, the braking-force switching process can be completed quickly and thus electric energy consumption can be reduced. The aforementioned rate of decrease and the aforementioned rate of increase each have an upper limit value according to, for example, the specifications of the braking devices 21 and the specifications of the driving motors 15.

The controller 120 desirably completes the switching process in a state where the braking devices 21 are generating a braking force. In detail, after the switching process is completed, the controller 120 desirably continues causing the braking devices 21 to generate a relatively small braking force. Consequently, the braking force from the braking devices 21 can be quickly increased when, for example, a braking operation is performed by the driver. In other words, the responsiveness of the braking devices 21 can be improved.

As mentioned above, during the low-speed cruise control mode, the braking control is executed under a condition where, for example, the vehicle 1 traveling on a first road enters a second road having a downward gradient relative to the advancing direction on the first road (e.g., travels from a flat road to a downhill road). During the low-speed cruise control mode, the braking control is executed under a condition where, for example, the vehicle 1 starts moving from a halted state on a downhill road. The transition of various types of state quantities in a case where the braking control is executed under the aforementioned conditions will be described below with reference to FIG. 4 and FIG. 5.

Figure 4:
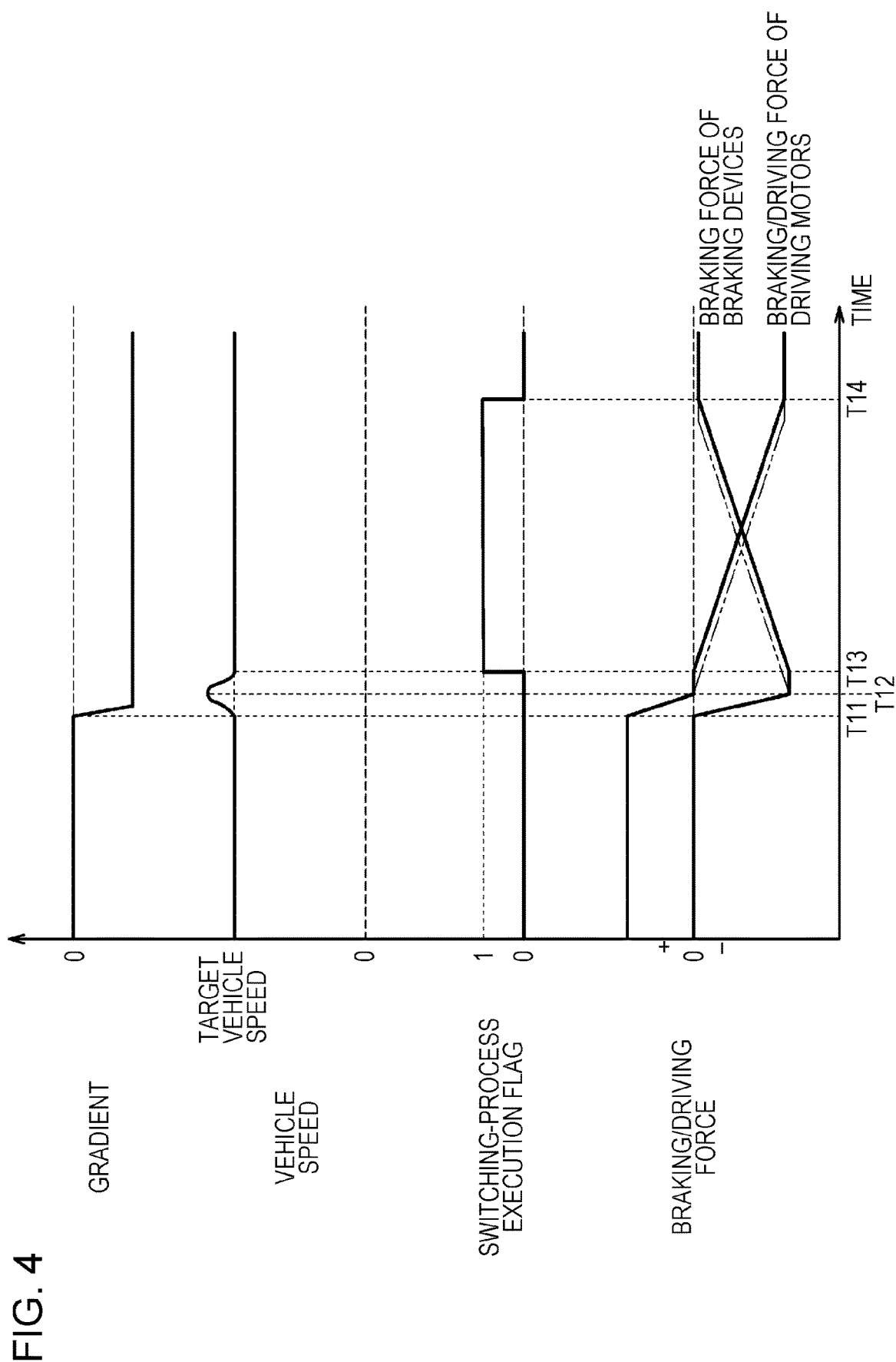
FIG. 4 illustrates an example of transition of various types of state quantities in a case where braking control is executed as the vehicle according to the embodiment of the disclosure enters a downhill road from a flat road.

FIG. 4 illustrates an example of the transition of various types of state quantities in a case where the braking control is executed as the vehicle 1 enters a downhill road from a flat road. In detail, FIG. 4 illustrates the transition of various types of state quantities including the gradient of a road, the vehicle speed, a switching-process execution flag, and a braking/driving force of the vehicle 1 (i.e., a braking/driving force of the driving motors 15 and a braking force of the braking devices 21). A case where the braking/driving force is a positive value corresponds to a case where a driving force (i.e., a force in the advancing direction of the vehicle 1) is applied to the vehicle 1, whereas a case where the braking/driving force is a negative value corresponds to a case where a braking force (i.e., a force in the reverse direction relative to the advancing direction of the vehicle 1) is applied to the vehicle 1.

The switching-process execution flag is 1 when the switching process is executed, and is 0 when the switching process is not executed. For example, the switching-process execution flag is stored in a storage element of the control device 100 and is rewritten by the controller 120.

In the example illustrated in FIG. 4, the vehicle 1 is traveling on a flat road prior to a time point T11 in a state where the driving mode is set to the low-speed cruise control mode. Thus, a driving force is applied to the vehicle 1 by the driving motors 15 and the vehicle speed is maintained at the target vehicle speed. As it is apparent in FIG. 4 that the gradient decreases at the time point T11, the braking control is executed as the vehicle 1 begins to enter a downhill road from the flat road. Consequently, braking by the braking devices 21 commences at the time point T11, and the driving force from the driving motors 15 begins to decrease.

In this embodiment, as mentioned above, the braking control involves the controller 120 causing the braking devices 21 to generate a braking force without using the regenerative braking of the driving motors 15. Thus, from a time point T12 and onward when the driving motors 15 stop applying a driving force to the vehicle 1, the regenerative braking of the driving motors 15 is prohibited and thus the vehicle 1 is braked by the braking force from the braking devices 21.

As mentioned above, from the time point T11 and onward, the vehicle 1 is braked by the braking devices 21, but the vehicle 1 still accelerates so that the vehicle speed increases. Thus, as illustrated in FIG. 4, the vehicle speed changes from the time point T11 and onward. Then, at a time point T13 subsequent to the time point T12, it is determined that the vehicle speed has become stable. The switching-process execution flag thus becomes 1 at the time point T13, and the switching process commences.

Consequently, from the time point T13 and onward, the braking force according to the regenerative braking of the driving motors 15 increases while the braking force from the braking devices 21 decreases. Subsequently, at a time point 114, the switching-process execution flag becomes 0 in a state where the braking force from the braking devices 21 is still being slightly generated, and the switching process ends.

In FIG. 4, the transition of the braking/driving force from the driving motors 15 and the transition of the braking force from the braking devices 21 in a case where the regenerative braking of the driving motors 15 is supposedly not prohibited from the time point T12 and onward are indicated with double-dotted chain lines. In this case, the braking-force switching process commences from the time point T12 when the driving motors 15 stop applying a driving force to the vehicle 1. Prior to the time point T13 when the vehicle speed is stable, the vehicle speed changes significantly, and the target braking force also changes significantly with the change in the vehicle speed. Thus, the braking-force switching process is undesirably performed under a condition where the target braking force is significantly changing. Consequently, a shock may possibly occur in the vehicle 1 during the braking-force switching process.

In contrast, in this embodiment, the regenerative braking of the driving motors 15 is prohibited from the time point T12 and onward, and thus the vehicle 1 is braked by the braking force from the braking devices 21. Subsequently, at the time point T13 when the vehicle speed of the vehicle 1 becomes stable, the switching process commences. Consequently, a situation in which the braking-force switching process is performed under a condition where the target braking force is significantly changing due to a change in the vehicle speed can be suppressed. Thus, during the cruise control mode, the braking-force switching process can be performed while a shock occurring in the vehicle 1 can be suppressed.

Figure 5:
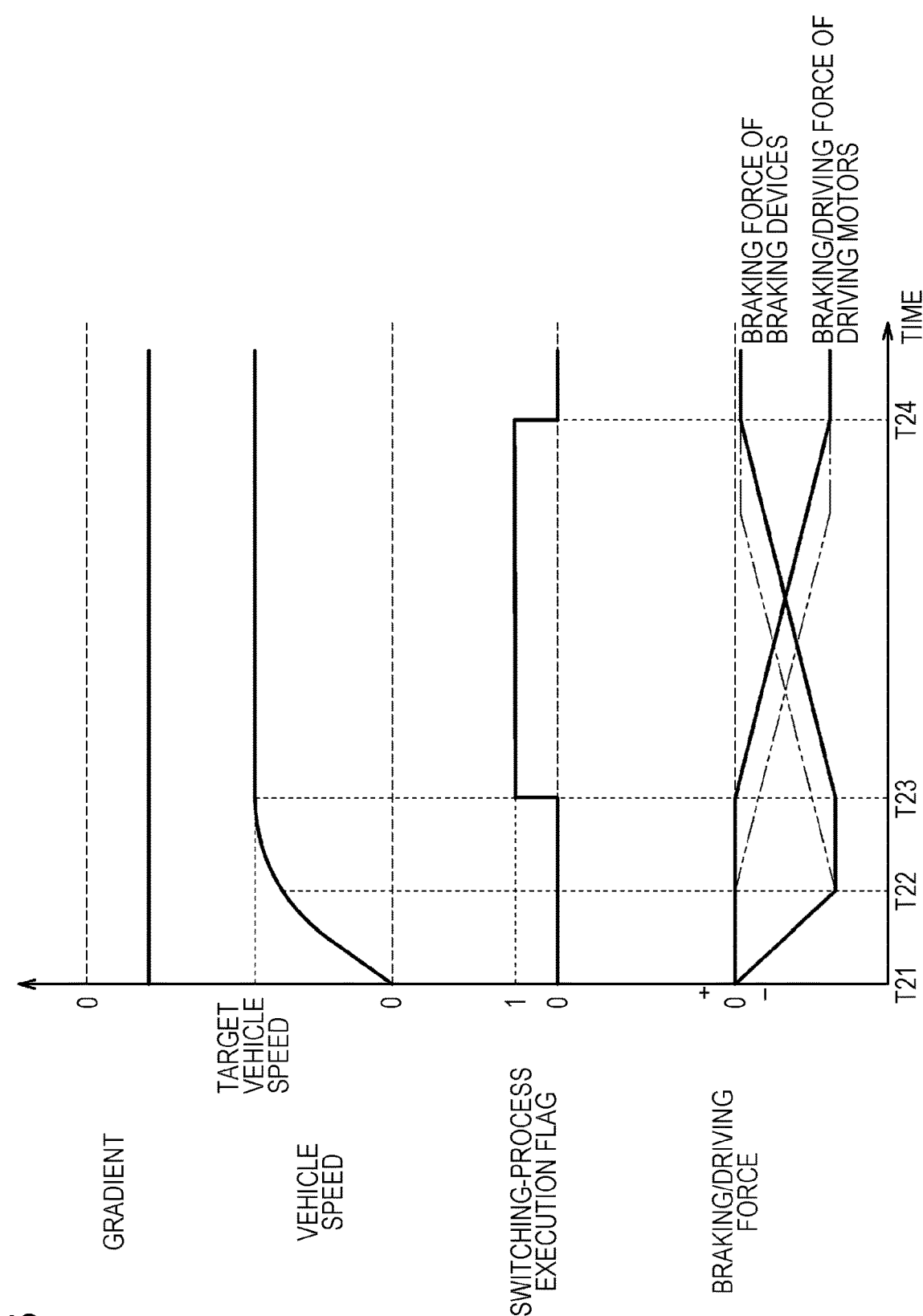
FIG. 5 illustrates an example of transition of various types of state quantities in a case where braking control is executed as the vehicle according to the embodiment of the disclosure starts moving from a halted state on a downhill road.

FIG. 5 illustrates an example of the transition of various types of state quantities in a case where the braking control is executed as the vehicle 1 starts moving from a halted state on a downhill road. In detail, FIG. 5 is similar to FIG. 4 in that it illustrates the transition of various types of state quantities including the gradient of a road, the vehicle speed, a switching-process execution flag, and a braking/driving force of the vehicle 1 (i.e., a braking/driving force of the driving motors 15 and a braking force of the braking devices 21).

In the example illustrated in FIG. 5, the vehicle 1 halted on the downhill road starts moving at a time point T21 in a state where the driving mode is set to the low-speed cruise control mode. Thus, as the vehicle 1 halted on the downhill road starts moving at the time point T21, the braking control is executed. Consequently, braking by the braking devices 21 commences at the time point T21.

In this embodiment, as mentioned above, the braking control involves the controller 120 causing the braking devices 21 to generate a braking force without using the regenerative braking of the driving motors 15. Thus, from the time point T21 and onward, the regenerative braking of the driving motors 15 is prohibited and thus the vehicle 1 is braked by the braking force from the braking devices 21.

On a downhill road, the weight of the vehicle 1 has an effect on the direction in which the vehicle 1 advances forward. Furthermore, when the vehicle 1 is to be braked in the cruise control mode, a target braking force is calculated such that the vehicle speed approaches the target vehicle speed. In the example illustrated in FIG. 5, the braking force of the braking devices 21 reaches the target braking force at a time point T22 subsequent to the time point T21. From the time point T21 and onward when the vehicle 1 has started moving, the vehicle 1 accelerates so that the vehicle speed increases toward the target vehicle speed. Thus, as illustrated in FIG. 5, the vehicle speed changes from the time point T21 and onward.

Then, at a time point T23 subsequent to the time point T22, the vehicle 1 has completely accelerated to the target vehicle speed, and it is determined that the vehicle speed has become stable. The switching-process execution flag thus becomes 1 at the time point T23, and the switching process commences. Consequently, from the time point T23 and onward, the braking force according to the regenerative braking of the driving motors 15 increases while the braking force from the braking devices 21 decreases. Subsequently, at a time point 124, the switching-process execution flag becomes 0 in a state where the braking force from the braking devices 21 is still being slightly generated, and the switching process ends.

In FIG. 5, the transition of the braking/driving force from the driving motors 15 and the transition of the braking force from the braking devices 21 in a case where the regenerative braking of the driving motors 15 is supposedly not prohibited from the time point T21 and onward are indicated with double-dotted chain lines. In this case, the braking-force switching process commences from the time point T22 when the braking force from the braking devices 21 reaches the target braking force. Prior to the time point T23 when the vehicle speed is stable, the vehicle speed changes significantly, and the target braking force also changes significantly with the change in the vehicle speed. Thus, the braking-force switching process is undesirably performed under a condition where the target braking force is significantly changing. Consequently, a shock may possibly occur in the vehicle 1 during the braking-force switching process.

In contrast, in this embodiment, the regenerative braking of the driving motors 15 is prohibited from the time point T21 and onward, and the vehicle 1 is braked by the braking force from the braking devices 21. Subsequently, at the time point T23 when the vehicle speed of the vehicle 1 becomes stable, the switching process commences.

Consequently, a situation in which the braking-force switching process is performed under a condition where the target braking force is significantly changing due to a change in the vehicle speed can be suppressed. Thus, during the cruise control mode, the braking-force switching process can be performed while a shock occurring in the vehicle 1 can be suppressed.

Although the above description relates to an example where whether the braking control is to be executed is determined based on the acceleration of the vehicle 1, the method for determining whether the braking control is to be executed is not limited to this example.

For example, during the cruise control mode, the controller 120 may execute the braking control if the vehicle speed of the vehicle 1 exceeds a reference vehicle speed. In this case, the determiner 121 determines that the vehicle 1 is likely to accelerate in accordance with a change in the traveling condition of the vehicle 1 when the vehicle speed has exceeded the reference vehicle speed. The reference vehicle speed is appropriately set to a value based on which it is appropriately determinable whether the vehicle 1 is likely to accelerate in accordance with a change in the traveling condition of the vehicle 1.

For example, if the vehicle speed of the vehicle 1 exceeds the reference vehicle speed when the vehicle 1 is traveling (i.e., after a predetermined time period has elapsed from when the vehicle 1 starts moving), the determiner 121 can determine that the vehicle 1 is likely to accelerate as the vehicle 1 traveling on a first road enters a second road having a downward gradient relative to the advancing direction on the first road (e.g., travels from a flat road to a downhill road). In this case, the reference vehicle speed may be set to, for example, a speed higher than the target vehicle speed to an extent that it is appropriately determinable whether the vehicle 1 has entered the second road from the first road.

Furthermore, if the vehicle speed of the vehicle 1 exceeds the reference vehicle speed after the vehicle 1 starts moving (i.e., before a predetermined time period elapses from when the vehicle 1 starts moving), the determiner 121 can determine that the vehicle 1 is likely to accelerate as the vehicle 1 starts moving from a halted state on a downhill road. In this case, for example, the reference vehicle speed may be set for each time period elapsed from when the vehicle 1 starts moving, and may be set to a speed high enough to an extent that it is appropriately determinable whether the vehicle 1 has started moving from a halted state on a downhill road.

Furthermore, for example, the controller 120 may determine whether the braking control is to be executed based on the gradient of the road during the cruise control mode. For example, the gradient of the road may be acquired by using a detection result of a sensor that detects the acceleration of the vehicle 1 or by using map data. For example, based on the gradient of the road at the current location of the vehicle 1, the controller 120 may determine that the vehicle 1 is likely to accelerate and execute the braking control if it is determined that the vehicle 1 has started moving from a halted state on a downhill road. Moreover, for example, based on the transition of gradients of roads in the past, the controller 120 may determine that the vehicle 1 is likely to accelerate and execute the braking control if it is determined that the vehicle 1 has entered a second road from a first road (e.g., a downhill road from a flat road).

Advantages of Control Device

Next, the advantages of the control device 100 according to the embodiment of the disclosure will be described.

In the control device 100 according to this embodiment, the controller 120 executes braking control in accordance with a change in the traveling condition of the vehicle 1 during the cruise control mode. The braking control includes braking by the braking devices 21 and regenerative braking by the driving motors 15. Then, in the braking control, the controller 120 causes the braking devices 21 to generate a braking force without using the regenerative braking of the driving motors 15, and subsequently executes a braking-force switching process if it is determined that the vehicle speed of the vehicle 1 has become stable. The braking-force switching process involves increasing the braking force according to the regenerative braking of the driving motors 15 while reducing the braking force applied by the braking devices 21. Accordingly, a situation in which the braking-force switching process is performed under a condition where the target braking force is significantly changing due to a change in the vehicle speed can be suppressed. Consequently, during the cruise control mode, the braking-force switching process can be performed while a shock occurring in the vehicle 1 can be suppressed.

Furthermore, in the control device 100 according to this embodiment, the controller 120 desirably executes the braking control if the acceleration of the vehicle 1 exceeds the reference acceleration during the cruise control mode. Consequently, the braking control can be appropriately executed when the vehicle 1 is likely to accelerate in accordance with a change in the traveling condition of the vehicle 1. Accordingly, excessive acceleration of the vehicle 1 is appropriately suppressed, and the braking-force switching process can be performed while a shock occurring in the vehicle 1 can be suppressed.

Furthermore, in the control device 100 according to this embodiment, the controller 120 desirably executes the braking control if the vehicle speed of the vehicle 1 exceeds the reference vehicle speed during the cruise control mode. Consequently, the braking control can be appropriately executed when the vehicle 1 is likely to accelerate in accordance with a change in the traveling condition of the vehicle 1. Accordingly, excessive acceleration of the vehicle 1 is appropriately suppressed, and the braking-force switching process can be performed while a shock occurring in the vehicle 1 can be suppressed.

Furthermore, in the control device 100 according to this embodiment, the controller 120 desirably executes the braking control if the vehicle 1 traveling on a first road enters a second road having a downward gradient relative to the advancing direction on the first road during the cruise control mode. Accordingly, excessive acceleration of the vehicle 1 is appropriately suppressed when the vehicle 1 traveling on a first road enters a second road, and the braking-force switching process can be performed while a shock occurring in the vehicle 1 can be suppressed.

Furthermore, in the control device 100 according to this embodiment, it is desirable that the aforementioned first road be either one of a flat road and an uphill road and that the aforementioned second road be a downhill road. Accordingly, excessive acceleration of the vehicle 1 is appropriately suppressed when the vehicle 1 traveling on either one of a flat road and an uphill road enters a downhill road, and the braking-force switching process can be performed while a shock occurring in the vehicle 1 can be suppressed.

Furthermore, in the control device 100 according to this embodiment, it is desirable that the aforementioned first road be an uphill road and that the aforementioned second road be a flat road. Accordingly, excessive acceleration of the vehicle 1 is appropriately suppressed when the vehicle 1 traveling on an uphill road enters a flat road, and the braking-force switching process can be performed while a shock occurring in the vehicle 1 can be suppressed.

Furthermore, in the control device 100 according to this embodiment, the controller 120 desirably executes the braking control if the vehicle 1 starts moving from a halted state on a downhill road during the cruise control mode. Accordingly, excessive acceleration of the vehicle 1 is appropriately suppressed when the vehicle 1 starts moving from a halted state on a downhill road, and the braking-force switching process can be performed while a shock occurring in the vehicle 1 can be suppressed.

Furthermore, in the control device 100 according to this embodiment, the controller 120 desirably terminates the switching process in a state where the braking devices 21 are generating a braking force. Consequently, the braking force from the braking devices 21 can be quickly increased when, for example, a braking operation is performed by the driver. In other words, the responsiveness of the braking devices 21 can be improved.

Furthermore, in the control device 100 according to this embodiment, the braking control executed by the controller 120 during the low-speed cruise control mode desirably involves causing the braking devices 21 to generate a braking force without using the regenerative braking of the driving motors 15 and subsequently executing the switching process if it is determined that the vehicle speed of the vehicle 1 has become stable. As mentioned above, in the low-speed cruise control mode, a scene where the vehicle 1 travels on a rough road surface or on a road surface with large variations in the gradient is expected, as compared with the high-speed cruise control mode, and therefore the vehicle speed is liable to change. This implies that the target braking force is likely to change due to the change in the vehicle speed, and thus the possibility of the occurrence of a shock increases in the vehicle 1 in the braking-force switching process.

Accordingly, the braking control executed during the low-speed cruise control mode involves causing the braking devices 21 to generate a braking force without using the regenerative braking of the driving motors 15 and subsequently executing the switching process if it is determined that the vehicle speed of the vehicle 1 has become stable, whereby the advantage of realizing the braking-force switching process while suppressing a shock occurring in the vehicle 1 can be effectively utilized.

Although the embodiment of the disclosure has been described above with reference to the appended drawings, the disclosure is not limited to the above embodiment. Needless to say, various modifications and alterations within the scope defined the claims are included in the technical scope of the disclosure.

For example, although the vehicle 1 described above is an electric vehicle equipped with the front-wheel driving motor 15f and the rear-wheel driving motor 15r as driving sources, the configuration of the vehicle equipped with the control device according to the embodiment of the disclosure is not particularly limited to the vehicle 1. For example, the vehicle equipped with the control device according to the embodiment of the disclosure may be an electric vehicle provided with different driving motors (i.e., four driving motors) for the individual wheels, or may be a hybrid vehicle equipped with a driving motor and an engine as driving sources. Furthermore, for example, the vehicle equipped with the control device according to the embodiment of the disclosure may be a vehicle obtained by adding a component to, changing a component in, or deleting a component from the vehicle 1 described with reference to FIG. 1.

Furthermore, for example, the process described with reference to the flowchart in this description may be executed in a sequence different from that indicated in the flowchart. Moreover, an additional step may be used, or one or more steps may be omitted.

The control device 100 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 100 including the identifier 110 and the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle control device comprising:
a controller configured to control operation of a braking device that is to apply a target braking force to a vehicle, and configured to control operation of a driving motor that is to output a driving force to the vehicle,
wherein the controller is capable of executing a normal mode and a cruise control mode that are switchable, the normal mode being a mode in which acceleration and deceleration of the vehicle are controlled in accordance with an acceleration-and-deceleration operation by a driver, the cruise control mode being a mode in which a vehicle speed of the vehicle is maintained at a target vehicle speed by controlling torque of the driving motor without being dependent on the acceleration-and-deceleration operation by the driver,
wherein the controller is configured to execute braking control during the cruise control mode in accordance with a change in a traveling condition of the vehicle, the braking control including braking by the braking device as a braking force and regenerative braking by the driving motor as a regenerative braking force, and
wherein, during the cruise control mode, the braking control includes causing the braking device to generate the braking force that equals the target braking force without using the regenerative braking of the driving motor and subsequently executing a braking-force switching process when a determination result indicates that the vehicle speed of the vehicle has become stable with respect to the target vehicle speed of the cruise control mode, the braking-force switching process including maintaining the target braking force to the vehicle by increasing the regenerative braking force according to the regenerative braking of the driving motor while reducing the braking force from the braking device.

2. The vehicle control device according to claim 1, wherein the controller is configured to execute the braking control when the acceleration of the vehicle exceeds reference acceleration during the cruise control mode.

3. The vehicle control device according to claim 2, wherein the controller is configured to execute the braking control when the vehicle speed of the vehicle exceeds a reference vehicle speed during the cruise control mode.

4. The vehicle control device according to claim 2, wherein the controller is configured to execute the braking control when the vehicle traveling on a first road enters a second road having a downward gradient relative to an advancing direction on the first road during the cruise control mode.

5. The vehicle control device according to claim 4, wherein the first road is either one of a flat road and an uphill road, and
wherein the second road is a downhill road.

6. The vehicle control device according to claim 4, wherein the first road is an uphill road, and
wherein the second road is a flat road.

7. The vehicle control device according to claim 2, wherein the controller is configured to execute the braking control when the vehicle starts moving from a halted state on a downhill road during the cruise control mode.

8. The vehicle control device according to claim 2, wherein the controller is configured to terminate the switching process in a state where the braking force is generated by the braking device.

9. The vehicle control device according to claim 2, wherein the cruise control mode includes a high-speed cruise control mode and a low-speed cruise control mode that are switchable and executable by the controller, the low-speed cruise control mode being a mode in which a target vehicle speed is lower than a target vehicle speed in the high-speed cruise control mode, and
wherein the braking control executed during the low-speed cruise control mode includes causing the braking device to generate the braking force without using the regenerative braking of the driving motor and subsequently executing the switching process when a determination result indicates that the vehicle speed of the vehicle has become stable.

10. The vehicle control device according to claim 1, wherein the controller is configured to execute the braking control when the vehicle speed of the vehicle exceeds a reference vehicle speed during the cruise control mode.

11. The vehicle control device according to claim 1, wherein the controller is configured to execute the braking control when the vehicle traveling on a first road enters a second road having a downward gradient relative to an advancing direction on the first road during the cruise control mode.

12. The vehicle control device according to claim 11, wherein the first road is either one of a flat road and an uphill road, and
wherein the second road is a downhill road.

13. The vehicle control device according to claim 11, wherein the first road is an uphill road, and
wherein the second road is a flat road.

14. The vehicle control device according to claim 1, wherein the controller is configured to execute the braking control when the vehicle starts moving from a halted state on a downhill road during the cruise control mode.

15. The vehicle control device according to claim 1, wherein the controller is configured to terminate the switching process in a state where the braking force is generated by the braking device.

16. The vehicle control device according to claim 1, wherein the cruise control mode includes a high-speed cruise control mode and a low-speed cruise control mode that are switchable and executable by the controller, the low-speed cruise control mode being a mode in which a target vehicle speed is lower than a target vehicle speed in the high-speed cruise control mode, and
wherein the braking control executed during the low-speed cruise control mode includes causing the braking device to generate the braking force without using the regenerative braking of the driving motor and subsequently executing the switching process when a determination result indicates that the vehicle speed of the vehicle has become stable.

17. The vehicle control device according to claim 1, wherein a rate of decrease of the braking force from the braking device and increase of the regenerative braking force during the braking-force switching process is maximized to a limit of a specification of the braking device.

18. The vehicle control device according to claim 1, wherein, after the braking-force switching process is completed, the controller continues causing the braking device to generate the braking force from the braking device.

19. A vehicle control device comprising:
circuitry configured to:
control operation of a braking device that is to apply a target braking force to a vehicle and control operation of a driving motor that is to output a driving force to the vehicle,
execute a normal mode and a cruise control mode that are switchable, the normal mode being a mode in which acceleration and deceleration of the vehicle are controlled in accordance with an acceleration-and-deceleration operation by a driver, the cruise control mode being a mode in which a vehicle speed of the vehicle is maintained at a target vehicle speed by controlling torque of the driving motor without being dependent on the acceleration-and-deceleration operation by the driver, and
execute braking control during the cruise control mode in accordance with a change in a traveling condition of the vehicle, the braking control including braking by the braking device as a braking force and regenerative braking by the driving motor as a regenerative braking force,
wherein, during the cruise control mode, the braking control includes causing the braking device to generate the braking force that equals the target braking force without using the regenerative braking of the driving motor and subsequently executing a braking-force switching process when a determination result indicates that the vehicle speed of the vehicle has become stable with respect to the target vehicle speed of the cruise control mode, the braking-force switching process including maintaining the target braking force to the vehicle by increasing the regenerative braking force according to the regenerative braking of the driving motor while reducing the braking force from the braking device.

* * * * *